United States Patent
Lee et al.

(10) Patent No.: US 11,242,007 B2
(45) Date of Patent: Feb. 8, 2022

(54) DRIVING APPARATUS OF SIDE MIRROR, VEHICLE HAVING THE SIDE MIRROR AND METHOD FOR CONTROLLING THE SAME

(71) Applicants: Hyundai Motor Company, Seoul (KR); Kia Motors Corporation, Seoul (KR); SL Mirrortech Corporation, Siheung-si (KR)

(72) Inventors: Jinsil Lee, Seoul (KR); IllSoo Kim, Suwon-si (KR); Jae Hong Choi, Hwaseong-Si (KR); Hyun Min Jeon, Hwaseong-Si (KR); Chul Sung Lee, Gyeongsan-Si (KR); Chol Min Kim, Gyeongsan-Si (KR); Byeong Cheon Min, Gyeongsan-Si (KR); Seung Woo Seo, Gyeongsan-Si (KR)

(73) Assignees: Hyundai Motor Company, Seoul (KR); Kia Motors Corporation, Seoul (KR); SL Mirrortech Corporation, Siheung-si (KR)

( * ) Notice: Subject to any disclaimer, the term of this patent is extended or adjusted under 35 U.S.C. 154(b) by 161 days.

(21) Appl. No.: 16/683,041

(22) Filed: Nov. 13, 2019

(65) Prior Publication Data
US 2020/0189468 A1    Jun. 18, 2020

(30) Foreign Application Priority Data
Dec. 18, 2018 (KR) .......................... 10-2018-0164060

(51) Int. Cl.
*B60R 1/062* (2006.01)
*G05D 3/20* (2006.01)

(52) U.S. Cl.
CPC .............. *B60R 1/062* (2013.01); *G05D 3/20* (2013.01)

(58) Field of Classification Search
CPC .. B60R 1/00; B60R 1/062; B60R 1/06; B60R 1/02; B60R 1/07; B60R 1/064; B60R 1/066; B60R 1/072; G05D 3/20
See application file for complete search history.

(56) References Cited

U.S. PATENT DOCUMENTS 5,111,125 A * 5/1992 Barrs .................... B60R 1/07
318/466

* cited by examiner

*Primary Examiner* — Clifford Hilaire
*Assistant Examiner* — Tyler B Edwards
(74) *Attorney, Agent, or Firm* — Morgan, Lewis & Bockius LLP

(57) ABSTRACT

A vehicle may include a side mirror including a housing and a mirror member provided inside the housing and rotatable in a first axis and a second axis in the housing; an input unit configured to receive an identification information related to a driver; a driving apparatus configured to identify a target position corresponding to the identification information related to the driver, acquire a plurality of paths for moving the mirror member between the identified target position and the current position, identify each of positions for switching the movement direction of the acquired plurality of paths, select a path having positions for switching the movement direction closest to a predetermined center position among the respective positions for switching the movement direction thereof, and selectively control rotation of the first axis and rotation of the second axis of the mirror member based on the selected path.

20 Claims, 8 Drawing Sheets

DRIVING APPARATUS OF SIDE MIRROR, VEHICLE HAVING THE SIDE MIRROR AND METHOD FOR CONTROLLING THE SAME

CROSS-REFERENCE TO RELATED APPLICATION(S)

The present application claims priority to Korean Patent Application No. 10-2018-0164060, filed on Dec. 18, 2018 in the Korean Intellectual Property Office, the entire contents of which is incorporated herein for all purposes by this reference.

BACKGROUND OF THE PRESENT INVENTION

Field of the Invention

The present invention relates to a side mirror for controlling the movement of a mirror member inside a housing of the side mirror, a vehicle having the side minor, and a method for controlling the side minor.

Description of Related Art

A side mirror may be provided on the exterior of the vehicle body to protrude from the front left and right doors by a predetermined length and to provide the driver with a view of the rear of the vehicle.

These side mirrors could be manually folded or unfolded by the driver, and recently may be automatically folded or unfolded by the motor's power in a response to lock/unlock of the door or turn-on/turn-off of starting.

Furthermore, the minor provided inside the housing of the side minor may be moved by the operation of the driver.

As described above, when the minor of the side minor is moved by the user's operation inside the housing, there was a problem that the minor does not move due to the mechanical contact in the neighboring portion of the housing and the mirror, or the mirror moves in a zig-zag and the user recognizes them as a failure.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side mirror driving apparatus of moving the mirror member to a target position by use of a path close to the center position, a vehicle having the side mirror, and a control method thereof.

The other aspect provides a side mirror driving apparatus that moves the side mirror in a direction perpendicular to a direction in which the side mirror is moving during occurrence of mechanical interference, avoiding mechanical interference, a vehicle having a side mirror, and a control method thereof.

In accordance with one aspect of the present invention, a driving apparatus of a side mirror includes a mirror member provided inside the housing and selectively movable in the housing; a controller configured to acquire a plurality of paths for moving the mirror member from a current position to a target position, identify each of positions for switching the movement direction of the acquired plurality of paths, select a path having positions for switching the movement direction closest to a predetermined center position among the respective positions for switching the movement direction thereof, selectively control driving of the first driving unit and the second driving unit based on the selected path; a first driving unit connected to the mirror member and moving the mirror member with respect to the first axis in a response to a control command of the controller; and a second driving unit connected to the mirror member and moving the mirror member with respect to the second axis in a response to a control command of the controller.

The controller is configured to acquire a plurality of paths that are movable from the current position to the target position in one X-axial direction movement and one Y-axial direction movement.

The driving apparatus further includes a storage unit of storing coordinate information having an X-axis value as an angle when rotating about the first axis and a Y-axis value as an angle when rotating about the second axis, wherein the controller is configured to identify a current coordinate value corresponding to the current position and a target coordinate value corresponding to the target position, and acquire a plurality of paths movable from the current position to the target position by one X-axis movement and one Y-axis movement based on the identified current coordinate value and the target coordinate value when acquiring the plurality of paths.

The controller is configured to identify a coordinate value of a position for switching the movement direction which is shifted from one axis shift to another axis when identifying the positions for switching the movement direction corresponding to the plurality of paths.

The controller is configured to identify positions for switching the movement direction closest to a predetermined center position based on the coordinate value of the identified positions for switching the movement direction and the coordinate value of the center position and select a path having the identified closest positions for switching the movement direction when selecting the path.

When the position of the mirror member is equal to or longer than a reference time during movement of the mirror member by the one of the first and second axes, wherein the controller is configured to control the mirror member to be moved by a reference distance by an axis perpendicular to the one of the first and second axes.

When the mirror member is controlled to move by a reference distance by an axis perpendicular to the one of the first and second axes, wherein the controller is configured to move the mirror member by the reference distance in a direction toward the center position. When the mirror member moves by the reference distance, wherein the controller is configured to acquire a plurality of new paths from a moved position to the target position, select any one new path from the plurality of acquired new paths and control movement of the mirror member to the selected new path.

When the moved position of the mirror member is equal to or longer than the reference time during the driving of any one from the first driving unit and the second driving unit based on the selected path, wherein the controller is configured to control the driving of the other one of the first and second driving units. When controlling the other one of the first and second driving units, wherein the controller is configured to control the rotation direction of the other one of the first and second driving units so that the mirror member is moved to the predetermined center position.

In accordance with one aspect of the present invention, a vehicle includes a side mirror including a housing and a mirror member provided inside the housing and rotatable in a first axis and a second axis in the housing; an input unit configured to receive an identification information related to a driver; a driving apparatus configured to identify a target position corresponding to the identification information related to the driver, acquire a plurality of paths for moving the mirror member between the identified target position and the current position, identify each of positions for switching the movement direction of the acquired plurality of paths, select a path having positions for switching the movement direction closest to a predetermined center position among the respective positions for switching the movement direction thereof, and selectively control rotation of the first axis and rotation of the second axis of the mirror member based on the selected path.

The driving apparatus is configured to acquire a plurality of paths that are movable from the current position to the target position in one X-axial direction movement and one Y-axial direction movement.

The vehicle further includes a storage unit of storing coordinate information having an X-axis value as an angle when rotating about the first axis and a Y-axis value as an angle when rotating about the second axis, wherein the driving apparatus is configured to identify a current coordinate value corresponding to the current position and a target coordinate value corresponding to the target position, and acquire a plurality of paths movable from the current position to the target position by one X-axis movement and one Y-axis movement based on the identified current coordinate value and the target coordinate value when acquiring the plurality of paths, wherein the driving apparatus is configured to identify a coordinate value of a position for switching the movement direction which is shifted from one axis shift to another axis when identifying the positions for switching the movement direction corresponding to the plurality of paths, wherein the driving apparatus is configured to identify positions for switching the movement direction closest to a predetermined center position based on the coordinate value of the identified positions for switching the movement direction and the coordinate value of the center position and select a path having the identified closest positions for switching the movement direction when selecting the path.

When the position of the mirror member is equal to or longer than a reference time during movement of the mirror member by the one of the first and second axes, wherein the driving apparatus is configured to control the mirror member to be moved by a reference distance by an axis perpendicular to the one of the first and second axes.

When the mirror member is controlled to move by a reference distance by an axis perpendicular to the one of the first and second axes, wherein the driving apparatus is configured to move the mirror member by the reference distance in a direction toward the center position and when the mirror member moves by the reference distance, wherein the driving apparatus is configured to acquire a plurality of new paths from a moved position to the target position, select any one new path from the plurality of acquired new paths and control movement of the mirror member to the selected new path.

The driving apparatus includes a first driving unit connected to the mirror member and rotating the mirror member with respect to the first axis and a second driving unit connected to the mirror member and rotating the mirror member with respect to the second axis, and when the moved position of the mirror member is equal to or longer than the reference time during the driving of any one from the first driving unit and the second driving unit based on the selected path, wherein the driving apparatus is configured to control the driving of the other one of the first and second driving units.

When controlling the other one of the first and second driving units, wherein the driving apparatus is configured to control the rotation direction of the other one of the first and second driving units so that the mirror member is moved to the predetermined center position.

In accordance with one aspect of the present invention, a method for controlling a side mirror including a housing and a mirror member provided inside the housing and rotatable in a first axis and a second axis in the housing includes when an identification information related to a driver is received, identifying a target position corresponding to the identification information related to the driver; acquiring a plurality of paths for moving the mirror member between the identified target position and the current position; identifying each of positions for switching the movement direction of the acquired plurality of paths; selecting a path having positions for switching the movement direction closest to a predetermined center position among the respective positions for switching the movement direction; selectively controlling the rotation of the first axis and the rotation of the second axis of the mirror member based on the selected path; and when the position of the mirror member is equal to or longer than a reference time during rotation of the mirror member by the one of the first and second axes, moving the mirror member by a reference distance by an axis perpendicular to the one of the first and second axes.

The moving the mirror member by a reference distance by an axis perpendicular to the one of the axes includes moving the mirror member by the reference distance in a direction toward the center position.

The moving the mirror member by a reference distance by an axis perpendicular to the one of the axes includes operating the driving unit which is not driven among the first driving unit rotating the mirror member about the first axis and the second driving unit rotating the mirror member about the second axis for a reference moving time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
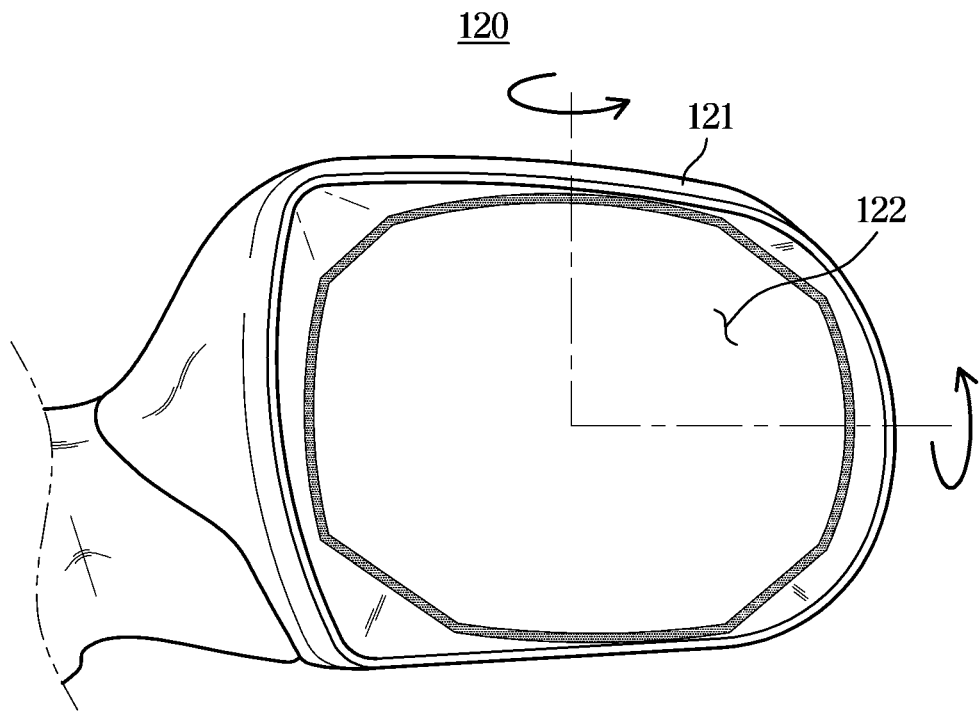
FIG. 1 is an exemplary view of a side mirror provided in a vehicle in accordance with various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the, the exemplary embodiments of the present invention is described with reference to the accompanying drawings.

FIG. 1 is an exemplary view of a side mirror provided in a vehicle in accordance with various exemplary embodiments of the present invention.

The side mirror 120 provides the driver with a view of the rear of the vehicle.

The side mirrors 120 may be automatically folded or unfolded in a response to lock/unlock of a door provided in the vehicle or start-on/off. That is, the side mirror 120 may perform folding and unfolding operations.

The side mirrors may include actuators for folding and unfolding operations. Wherein the actuator may include a motor.

The side mirror 120 includes a housing 121 forming an external appearance and a mirror member 122 provided inside the housing 121 so that the reflection surface is exposed to the outside.

The side mirror 120 maintains the unfolded state during traveling. At the instant time, the housing 121 may have curved form to minimize the resistance of the wind acting on the side mirror 120. That is, the housing 121 may have a shape gradually narrower toward the rear of the mirror member 122 with respect to the position of the mirror member 122.

The mirror member 122 of the side mirror 120 may be provided inside the housing 121 so that the reflecting surface reflecting the shape of the object behind the vehicle is exposed to the outside.

This mirror member 122 may rotate on the first axis and the second axis. The first axis may be the X-axis on the two-dimensional coordinate, and the second axis may be the Y-axis on the two-dimensional coordinate. The first axis may be perpendicular to the second axis.

The mirror member 122 may move in the X-axis and move in the Y-axis.

The movement distance when the mirror member 122 moves along the X-axis is referred to as a tilt angle of the first axis and the movement distance when the mirror member 122 is moved along the Y-axis is referred to as a pan angle of the second axis.

The mirror member 122 may be angularly adjusted by the driver.

The pan angle and the tilt angle may be adjusted by the external force applied by the driver's hand the pan angle and the tilt angle may be adjusted based on the signal of the input unit operated by the driver.

The tilt angle and pan angle of the mirror member 122 may be set corresponding to the physical condition of the driver.

This is because the direction in which the driver looks at the side mirror and the distance from the driver's eyes to the side mirror are different depending on the driver's physical condition. This may change the appearance of the object which may be seen through the side mirrors for each driver.

Accordingly, the driver may adjust the angle of the mirror member of the side mirror according to his or her physical condition. That is, the position of the rear portion of the vehicle reflected on the mirror member is adjusted.

Furthermore, the angle of the side mirror adjusted by the driver may be stored.

Furthermore, the vehicle may store the tilt angle and pan angle of the mirror member 122 of the side mirror which is set for each driver.

In the instant case, when the driver is recognized, the mirror member 122 of the side mirror 120 may be automatically adjusted to the tilt angle and the pan angle corresponding to the driver boarding the vehicle. At the instant time, the mirror member 122 automatically moves from the current position to the target position. Wherein movement of the mirror member may be rotation of the mirror member to the first axis and second axis.

With respect to the movement of the mirror member, the movement distance (i.e., corresponding to the tilt angle) when rotating by the first axis may be represented by the X-axis coordinate, and the movement distance when rotating by the second axis (i.e., corresponding to the pan angle) may be represented by Y-axis coordinates.

At the present time, the position of the coordinate point corresponding to the current tilt angle and pan angle may be the current position, and the position of the coordinate point corresponding to the tilt angle and pan angle set by the driver may be the target position.

Mechanical interference may be caused by the curved housing 121 when the mirror member 122 of the side mirror 120 rotates about the first axis or the second axis during the automatic angle adjustment.

That is, the mirror member 122 may be stopped before the target position is reached when mechanical interference occurs during the angle adjustment.

Further, when the mirror member 122 of the side mirror 120 rotates on the first axis or rotates on the second axis, mechanical interference may occur due to the external environment.

Here, the external environment may include the freezing temperature of winter season or the jamming of foreign matter, and the like.

The mirror member 122 of the side mirror 120 may avoid the mechanical interference by changing the direction of the rotation axis by the driving apparatus 130 when mechanical interference occurs during the automatic angle adjustment. The present specific configuration is described with reference to FIG. 2.

Figure 2:
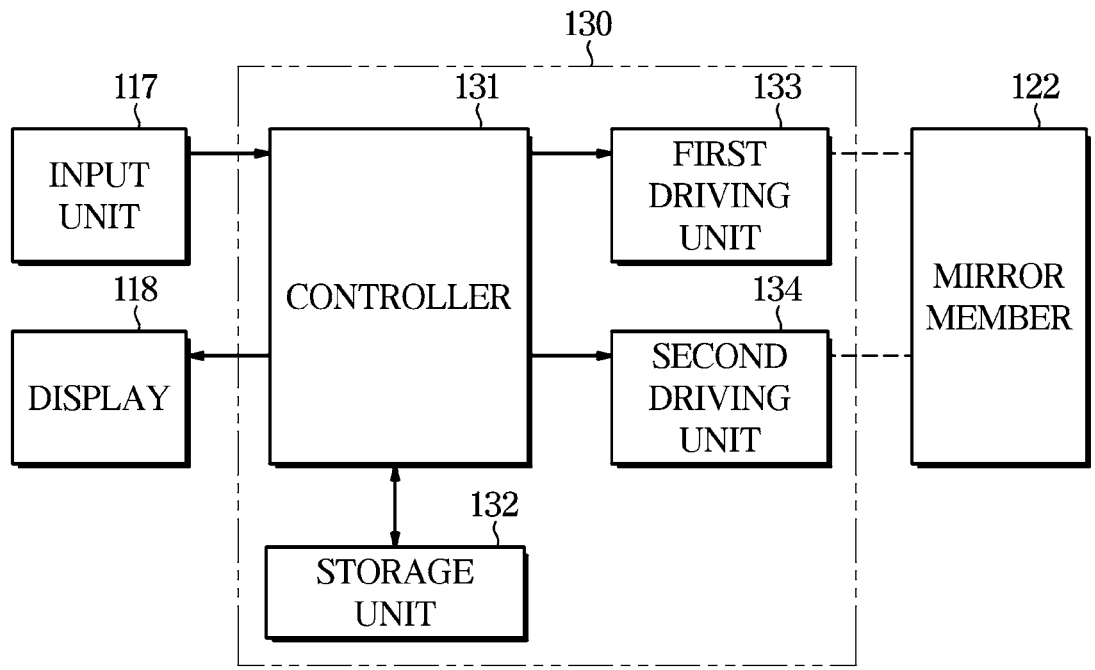
FIG. 2 is a control schematic diagram of a driving apparatus of a side mirror provided in a vehicle in accordance with various exemplary embodiments of the present invention.

FIG. 2 is a control schematic diagram of a driving apparatus of a side mirror provided in a vehicle in accordance with various exemplary embodiments of the present invention.

The vehicle includes an input unit 117, a display 118, a mirror member 122 of a side mirror, and a driving apparatus 130.

The input unit 117 receives the identification information related to the driver and transmits the input identification information related to the driver to the controller 131.

The input unit 117 may also receive a driver registration command for inputting the identification information related to the driver. Here, the driver registration instruction may include a driver registration start command a registration completion command.

The input unit 117 may receive a side mirror angle setting command for setting angle information related to the side mirror. Here, the setting command may include a setting start command a setting completion command.

That is, the input unit 117 receives the angle setting start command of the mirror member, transmits the setting start signal corresponding to the received angle setting start command to the controller 131, receives the angle setting completion command of the mirror member, transmits a setting completion signal corresponding to the angle setting completion command to the controller 131.

The input unit 117 may receive angle information related to the side mirrors.

The input unit 117 receives an adjustment signal of the tilt angle of the mirror member of the side mirror from the driver and transmits the received adjustment signal of the tilt angle to the controller 131, receives the adjustment signal of the pan angle of the mirror member and the transmits received adjustment signal of the pan angle to the controller 131.

The input unit 117 may be provided on the head unit and the center fascia, on the steering wheel, or on the armrest on the internal side of the door or knob.

The input unit may include at least one physical instrument such as an operation on/off button for various functions, a button for changing setting values of various functions, a key, a switch, and the like.

The input unit may further include a jog dial or a touch pad for inputting a movement command a selection command of a cursor displayed on a vehicle terminal (AVN: Audio Video Navigation). Here, the jog dial or the touch pad may be provided in a center fascia or the like.

The input unit may receive the identification information related to the driver, receive an input of the setting information related to the angle information related to the side mirror corresponding to the identification information related to the driver, and receive the setting information related to the position information related to the seat.

The identification information related to the driver may include at least one of surface image, iris, fingerprint, voice, and number.

The setting information related to the angle of the side mirror may include setting start information, angle information, and setting completion information, and the angle information may include a pan angle and a tilt angle.

The display 118 may display setting information during the setting of the angle of the side mirror. The display 118 may display the identification information related to the driver, display the adjustment information related to the side mirror corresponding to the identification information related to the driver. The adjustment information related to the side mirror may include adjustment start, adjustment, adjustment completion, and the like.

The display 118 may display the setting information during the setting of the angle of the side mirror. The setting information related to the angle of the side mirror may include setting start information, angle information, and setting completion information, and the angle information may include a pan angle and a tilt angle.

The display 118 may also display switching information related to the rotation axial direction by the mechanical interference during automatic angle adjustment of the mirror member 122 of the side mirror.

The vehicle may further include a cluster provided with a display. The cluster may display the driver's identification information on the display, display the adjustment information related to the side mirror corresponding to the identification information related to the driver, and display the adjustment information related to the seat.

The controller 131 performs the driver registration mode when the driver registration start command is received, controls the storage of the received identification information related to the driver when the identification information related to the driver is received in the driver registration mode and ends the driver registration mode when the driver registration completion command is received.

The controller 131 may receive the number (1, 2, 3, etc.) information when receiving the identification information related to the driver, receive the surface image information related to the driver, receive the voice information related to the driver and receive iris information or fingerprint information related to the driver.

The controller 131 may perform the angle setting mode when the angle setting start command of the mirror member is received, may control the operation of the display or the sound output unit to output a request for input of the driver's identification information, may control the storage of the angle information corresponding to the identification information related to the driver when the identification information related to the driver is received, may acquire the tilt angle of the mirror member based on the received adjustment signal of the tilt angle when an adjustment signal of the tilt angle is received, may acquire the pan angle of the mirror member based on the received adjustment signal of the pan angle when the adjustment signal of the pan angle is received, and may control the storage of the acquired tilt angle and pan angle and may end angle setting mode when the angle setting completion command of the mirror member is received.

The controller 131 moves the mirror member by a constant tilt angle every time an adjustment signal of the tilt angle is received from the input unit 117, moves the mirror member by a constant pan angle every time an adjustment signal of the pan angle is received from the input unit 117.

When the adjustment signal of the tilt angle is continuously received from the input unit 117 for a predetermined time or longer, the controller 131 acquires the tilt angle corresponding to the time at which the adjustment signal of the tilt angle is continuously received, and controls the rotation of the mirror member based on the acquired tilt angle.

When the adjustment signal of the pan angle is received continuously for a predetermined time or more from the input unit 117, the controller 131 acquires the pan angle corresponding to the time at which the adjustment signal of the pan angle is continuously received, and controls the rotation of the mirror member based on the acquired pan angle.

When the identification information related to the driver is received, the controller 131 identify the angle information related to the mirror member corresponding to the received identification information related to the driver, and controls movement of the mirror member based on the identified angle information related to the mirror member and the current angle information related to the mirror member.

The movement of the mirror member may include at least one of rotation about a first axis and rotation about a second axis.

Furthermore, the current angle information related to the mirror member may be information corresponding to the current position, and the identified angle information related to the mirror member may be information corresponding to the target position.

The controller 131 maintains the position of the mirror member when the current position and the target position are the same, and controls the movement of the mirror member when the current position and the target position are different.

When controlling the movement of the mirror member, the controller 131 acquires a path that moves from the current position to the target position, selects any one of the acquired paths, and controls at least one of the rotation on the first axis and rotation on the second axis based on the selected path.

The controller 131 may control the operation of the first driving unit 133 when the rotation on the first axis is controlled, and control the operation of the second driving unit 134 when the rotation on the second axis is controlled.

When acquiring the path, the controller 131 identifies the coordinate value of the current position and the coordinate value of the target position, and controls the movement to the Y-axis when the X-axis value of the coordinate value of the identified current position is equal to the X-axis value of the coordinate value of the identified target position and the Y-axis value of the coordinate value of the identified current position is different from the Y-axis value of the coordinate value of the identified target position.

When acquiring the path, the controller 131 identifies the coordinate value of the current position and the coordinate value of the target position, and controls the movement to the X-axis when the X-axis value of the coordinate value of the identified current position is different from the X-axis value of the coordinate value of the identified target position and the Y-axis value of the coordinate value of the identified current position is equal to the Y-axis value of the coordinate value of the identified target position.

When acquiring the path, the controller 131 identifies the coordinate value of the current position and the coordinate value of the target position, and generates a rectangle having a diagonal line connecting the current position and the target position and divide the four sides of the generated rectangle into two paths based on the diagonal line when the X-axis value of the coordinate value of the identified current position is different from the X-axis value of the coordinate value of the identified target position and the Y-axis value of the coordinate value of the identified current position is different from the Y-axis value of the coordinate value of the identified target position.

That is, the controller 131 acquires two paths connecting the X-axis side and the Y-axis side, and selects the path closer to the center position of the coordinates from the two paths as the path of movement of the mirror member.

The acquired two paths are referred to as the first path and the second path.

The controller 131 identifies a first point which is switched from the X-axis to the Y-axis in the first path and a second point which is switched from the X-axis to the Y-axis in the second path, acquires the first distance acquired by summing the X-axis value and the Y-axis value for moving from the identified first point to the center position of the coordinates, acquires the second distance acquired by summing the X-axis value and the Y-axis value for moving from the identified second point to the center position of the coordinates, and selects a path having a shorter distance among the acquired first and second distances as a path of motion of the mirror member.

The controller 131 also identifies a first point which is switched from the X-axis to the Y-axis in the first path and a second point which is switched from the X-axis to the Y-axis in the second path, acquires a first straight line distance between the identified first point and the center position of the coordinates, acquires a second straight line distance between the identified second point and the center position of the coordinates, selects a path having a shorter distance among the acquired first and second straight line distances as a path of motion of the mirror member.

The controller 131 determines whether mechanical interference has occurred during movement control of the mirror member to move from the current position to the target position based on the selected path, identifies the axis other than the axis which was being moved when it is determined that mechanical interference has occurred, and controls identified the other axis to move by the reference distance.

When controlling the mirror member to move by a reference distance on the other axis, the controller 131 identifies the direction close to the center portion of the coordinates, controls the movement by the reference distance in the identified direction thereof, controls again the axis that moved when mechanical interference occurs when movement is completed.

That is, the controller 131 moves the mirror member by a reference distance along the Y-axis when mechanical interference occurs during movement of the mirror member along the X-axis, and moves again the mirror member along the X-axis when the movement of the mirror member by the reference distance along the Y-axis is completed.

The controller 131 moves the mirror member by a reference distance along the X-axis when mechanical interference occurs during movement of the mirror member along the Y-axis, and moves again the mirror member along the Y-axis when the movement of the mirror member by the reference distance along the X-axis is completed. The controlling the movement by the reference distance may include rotating the mirror member by a reference angle and may include operating the motor configured for a reference movement time.

The controller 131 determines whether the current position of the mirror member is the target position during the movement control of the mirror member, and ends the movement control of the mirror member when it is determined that the current position is the target position.

The storage unit 132 stores the identification information related to the user and the angle information related to the side mirror corresponding to the identification information related to the user.

The storage unit 132 may store coordinate information having an X-axis corresponding to the first axis and a Y-axis corresponding to the second axis. The storage unit 132 may further store information related to the center position. That is, the storage unit 132 may further store the coordinate value of the center position.

The storage unit 132 may store a reference time for determining mechanical interference, and may store a reference distance for avoiding mechanical interference.

The reference time may be determined by the voltages of the first and second motors.

The storage unit 132 may stores a reference movement time for avoiding mechanical interference.

The first driving unit 133 includes a first actuator for rotating the mirror member 122 provided on the side mirror on the first axis. The first actuator may be a first motor.

That is, the first driving unit 133 may operate the first actuator based on the control command of the controller 131.

As the first actuator is operated by the first driving unit 133, the mirror member 122 is rotated on the first axis and may be rotated in the first rotation direction and the second rotation direction with respect to the first axis. The first rotation direction and the second rotation direction may be opposite to each other.

The second driving unit 134 includes a second actuator for rotating the mirror member 122 provided on the side mirror on the second axis. The second actuator may be a second motor.

That is, the second driving unit 134 may operate the second actuator based on the control command of the controller 131.

As the second actuator is operated by the second driving unit 133, the mirror member 122 is rotated on the second axis and may be rotated in the first rotation direction and the second rotation direction with respect to the second axis. The first rotation direction and the second rotation direction may be opposite to each other.

Furthermore, the first axis may be an axis parallel to the ground, and the second axis may be an axis perpendicular to the ground.

Figure 3:
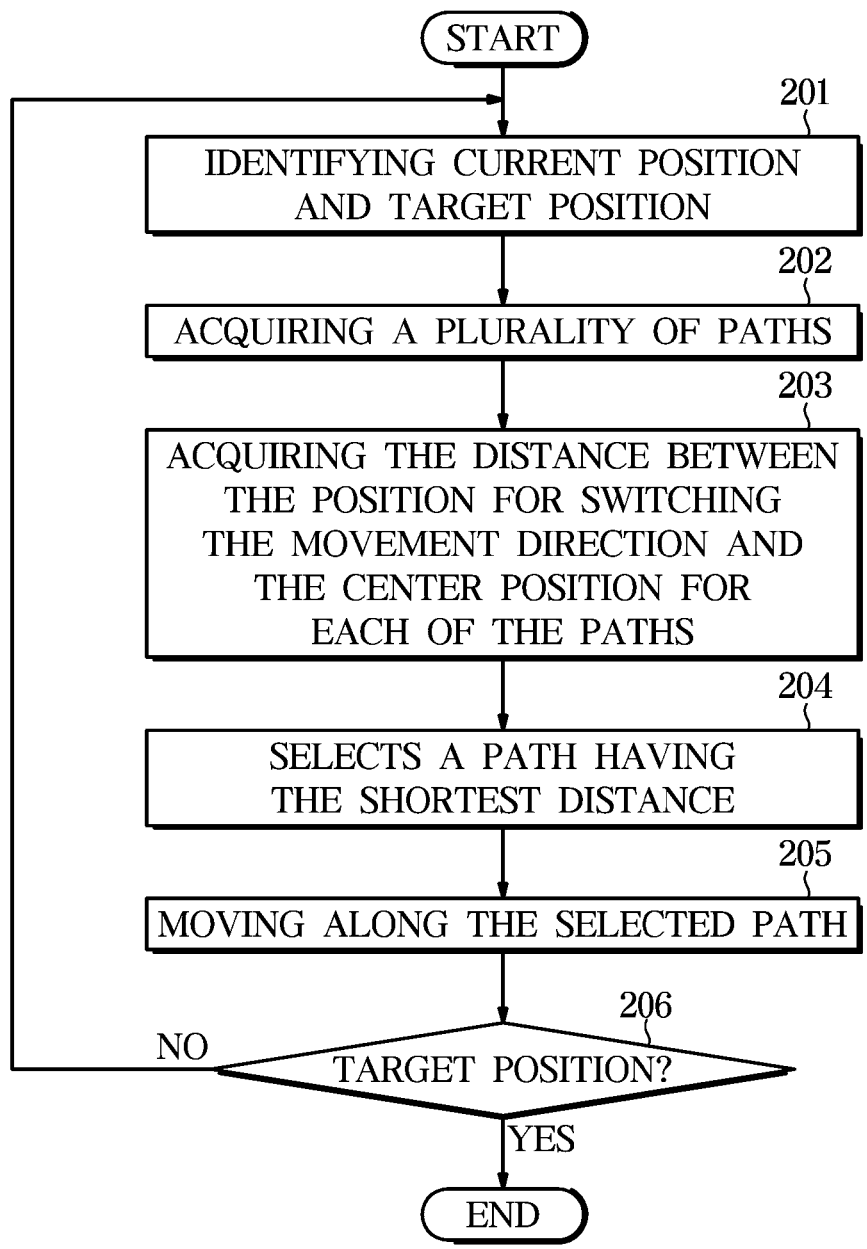
FIG. 3 is a flow chart of control of the side mirrors provided in the vehicle in accordance with various exemplary embodiments of the present invention, and is a flowchart of path selection and path movement.

FIG. 3 is a flow chart of control of the side mirrors provided in the vehicle in accordance with various exemplary embodiments of the present invention, is described with reference to FIG. 4 and FIG. 5.

Figure 4:
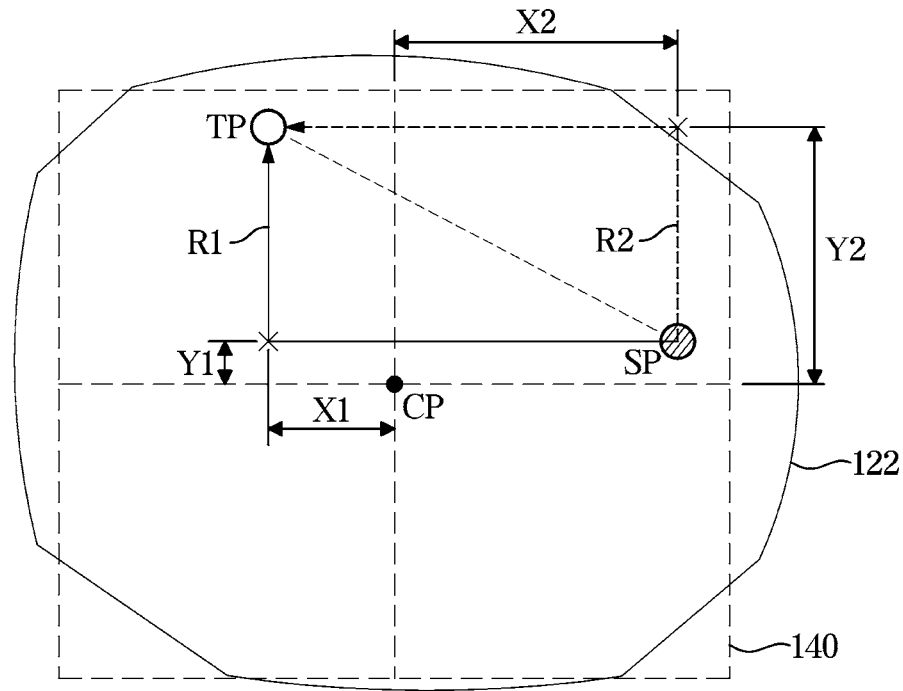
FIG. 4 and FIG. 5 are exemplary views illustrating selection of the movement path of the mirror member of the side mirror provided in the vehicle in accordance with various exemplary embodiments of the present invention.
Figure 5:
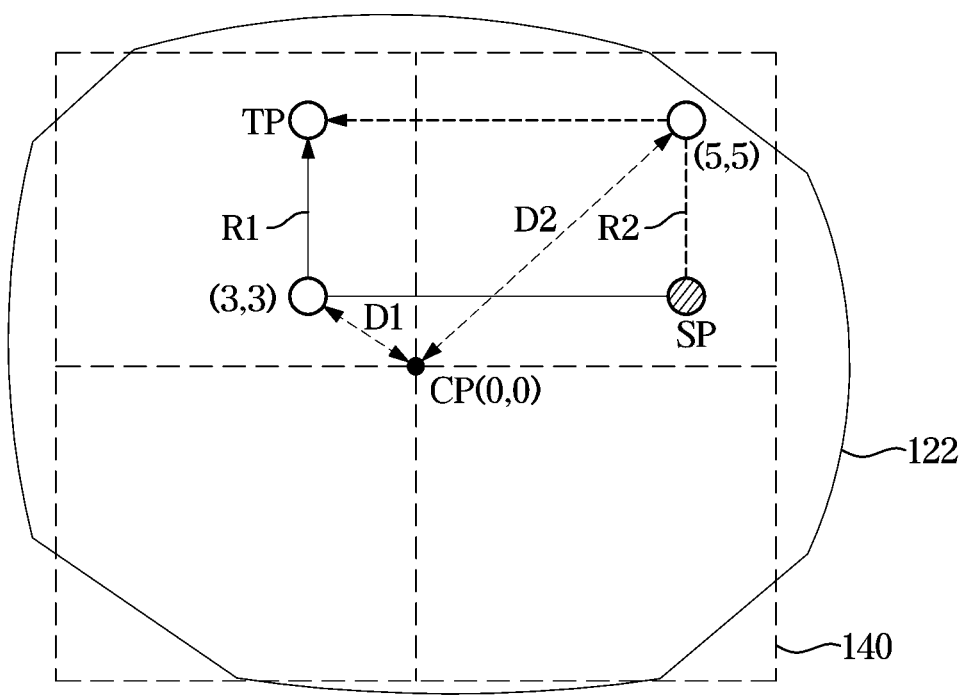

FIG. 4 and FIG. 5 are exemplary views illustrating selection of the movement path of the mirror member of the side mirror provided in the vehicle in accordance with various exemplary embodiments of the present invention.

Furthermore, the movement when the mechanical interference does not occur during the movement from the current position to the target position is described.

The vehicle identifies the angle information related to the mirror member corresponding to the identification information related to the driver when the identification information related to the driver is received. The identification information related to the driver may be transmitted to the driving apparatus of the side mirror. Furthermore, the driving apparatus of the side mirror may directly receive the identification information related to the driver.

The angle information related to the mirror member may include a tilt angle and a pan angle.

The driving apparatus of the side mirror provided in the vehicle identifies the current position of the mirror member and identifies the target position corresponding to the identified angle information related to the mirror member 201.

The current position may be a point having an X-axis value corresponding to the current tilt angle of the mirror member and a Y-axis value corresponding to the current pan angle.

And the target position may be a point having an X-axis value corresponding to the target tilt angle of the mirror member and a Y-axis value corresponding to the target pan angle.

That is, the driving apparatus of the side mirror provided in the vehicle may display the motion information related to the rotation of the mirror member in two-dimensional coordinates.

The driving apparatus of the side mirror provided in the vehicle may maintain the position of the mirror member when the current position is the same as the target position and may control the movement of the mirror member when the current position and the target position are different.

The driving apparatus of the side mirror moves the mirror member to the Y-axis when the X-axis value of the coordinate value of the identified current position is equal to the X-axis value of the coordinate value of the identified target position and the Y-axis value of the coordinate value of the identified current position is different from the Y-axis value of the coordinate value of the identified target position.

The driving apparatus of the side mirror moves the mirror member to the X-axis when the X-axis value of the coordinate value of the identified current position is different from the X-axis value of the coordinate value of the identified target position and the Y-axis value of the coordinate value of the identified current position is equal to the Y-axis value of the coordinate value of the identified target position.

Furthermore, the driving apparatus of the side mirror moves the mirror member with respect to the X-axis and also moves the mirror member with respect to the Y-axis when the X-axis value of the coordinate value of the identified current position is different from the X-axis value of the coordinate value of the identified target position and the Y-axis value of the coordinate value of the identified current position is different from the Y-axis value of the coordinate value of the identified target position.

That is, when the mirror member moves from the current position to the target position on the two-dimensional coordinate, the driving apparatus of the side mirror moves the mirror member from the current position to the target position with only one X-axis movement and one Y-axis movement. When the mirror member is moved in the two-dimensional coordinates along the X-axis and the Y-axis, the driving apparatus of the side mirror acquires a plurality of paths configured for moving from the current position to the target position 202, acquires the distance between the position for switching the movement direction and the center position for each of the acquired plurality of paths 203, and selects a path having the shortest distance among the acquired distances as a movement path of the mirror member 204. The plurality of paths may be two paths.

That is, the driving apparatus of the side mirror identifies the path that the distance between the position for switching the movement direction and the center position is the closest among the acquired plural paths, and selects the identified path as the movement path of the mirror member.

The position for switching the movement direction may have a coordinate value at a time point when the drive between the first drive unit and the second drive unit is switched.

Coordinate values corresponding to the center position may be stored in advance in the driving apparatus of the side mirrors.

A plurality of path acquisition and a path selection configuration is described with reference to FIG. 4 and FIG. 5.

For example, as shown in FIG. 4, the driving apparatus of the side mirror generates a rectangle having a diagonal line connecting the current position SP and the target position TP and divide the four sides of the generated rectangle into two paths R1, R2 based on the diagonal line. The driving apparatus of the side mirror acquires two paths connecting the X-axis side and the Y-axis side as the first path R1 and the second path R2, identifies a first switching position where the direction is switched from the X-axis to the Y-axis in the first path, acquires the X-axis distance X1 and the Y-axis distance Y1 between the identified first switching position and the center position, and acquires a first movement distance by summing the acquired X-axis distance X1 and Y-axis distance Y1.

Furthermore, the driving apparatus of the side mirror identifies the second switching position where the direction is switched from the X-axis to the Y-axis in the second path, acquires the X-axis distance X2 and the Y-axis distance Y2 between the identified second switching position and the center position, and acquires the second movement distance by summing the acquired X-axis distance X2 and Y-axis distance Y2.

The driving apparatus of the side mirror identifies the first movement distance and the second movement distance, and selects the path having the shortest movement distance among the identified movement distances as the movement path of the mirror member.

In other words, the driving apparatus of the side mirror selects a path near the center position from the two paths as the movement path of the mirror member. This is because the greater the movement from the center to the external side of the mirror member, the more mechanical interference between the housing and the mirror member occurs.

As an exemplary embodiment of the present invention, as shown in FIG. 5, the driving apparatus of the side mirror generates a rectangle having a diagonal line connecting the current position SP and the target position TP and divide the four sides of the generated rectangle into two paths R1, R2 based on the diagonal line.

The driving apparatus of the side mirror acquires two paths connecting the X-axis side and the Y-axis side as the first path R1 and the second path R2, identifies a first switching position where the direction is switched from the X-axis to the Y-axis in the first path, identifies the coordinate value of the identified first switching position, acquires the first straight distance D1 from the center position to the first switching position based on the identified coordinate value of the first switching position and the coordinate value of the center position.

The driving apparatus of the side mirror identifies a second switching position where the direction is switched from the X-axis to the Y-axis in the second path R2, identifies the coordinate value of the identified second switching position, and acquires the second straight distance D2 from the center position to the second switching position based on the identified coordinate value of the second switching position and the coordinate value of the center position.

For example, when the coordinate values of the first switching position are 3, 3 and the coordinate values of the second switching position are 5, 5, the driving apparatus of the side mirror acquires the first straight distance D1 to $3^2+3^2=18$, the second straight distance D2 to $5^2+5^2=50$.

The driving apparatus of the side mirror identifies the first straight distance and the second straight distance and selects the path having the shortest straight line distance among the identified straight distances as the movement path of the mirror member.

In other words, the driving apparatus of the side mirror may select the path having the shortest distance between the switching position and the center position among the plurality of paths.

The driving apparatus of the side mirror controls the movement of the mirror member based on the information related to the selected path.

In other words, the driving apparatus of the side mirror moves the mirror member along the X-axis through operation of the first driving unit so that the mirror member moves from the current position to the first switching position, and when the moved position is the first switching position, moves the mirror member from the first switching position to the target position by moving the mirror member in the Y-axis through operation of the second driving unit after the operation of the first driving unit is stopped Moving the mirror member along the X-axis may include tilt rotation of the mirror member about the first axis.

Moving the mirror member in the Y-axis may also include pan rotation of the mirror member about the second axis.

When the current position of the mirror member is determined to be the target position 206 during the movement of the mirror member, the driving apparatus of the side mirror stops the movement of the mirror member. Furthermore, the driving apparatus of the side mirror may display through the display or output sound through the sound output unit that the angle adjustment of the mirror member is completed.

Figure 6:
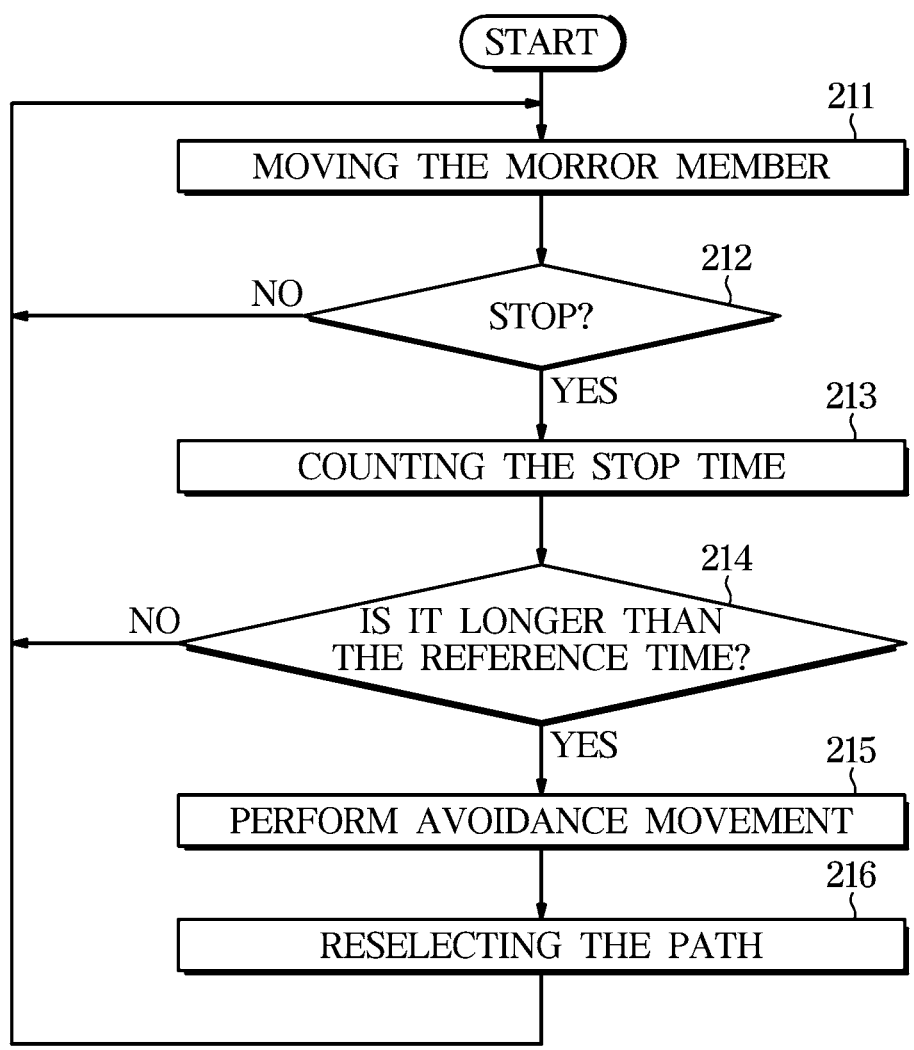
FIG. 6 is a control flowchart of a side mirror provided in a vehicle in accordance with various exemplary embodiments of the present invention, and is a control flowchart of a side mirror corresponding to occurrence of mechanical interference.

FIG. 6 is a control flowchart of a side mirror provided in a vehicle in accordance with various exemplary embodiments of the present invention, and is described with reference to FIG. 7 to FIG. 13.

FIG. 7, FIG. 8, FIG. 9, FIG. 10, FIG. 11, FIG. 12 and FIG. 13 are exemplary views illustrating mechanical interference avoidance of a mirror member of a side mirror provided in a vehicle in accordance with various exemplary embodiments of the present invention.

That is, FIG. 6 illustrates the avoidance movement when mechanical interference occurs during movement from the current position to the target position.

The driving apparatus of the side mirrors moves the mirror member to the target position 211, determines whether stop is occurred 212, if it is determined that the stop is not occurred, maintains the movement of the mirror member, if it is determined that the stop is occurred, counts the stop time from the stop time 213.

Determining whether the stop is occurred includes determining that the position on the two-dimensional coordinate during the operation of the first driving unit or the second driving unit is the same.

The driving apparatus of the side mirror compares the counted stop time with the reference time, maintains the movement of the mirror member when it is determined that the counted stop time is less than the reference time, and performs an avoidance movement 215 when it is determined that the counted stop time is longer than the reference time 214.

Performing the avoidance movement includes identifying the movement direction and moving by a reference distance in a direction opposite to the identified direction thereof, i.e., in a perpendicular direction thereof.

Moving by a reference distance may include moving during a reference movement time.

Furthermore, when moving by a reference distance in the perpendicular direction thereof, the driving apparatus of the side mirror moves the mirror member in the direction close to the center position.

In other words, performing the avoidance movement may include identifying the driving unit which is being driven and the non-driving unit, operating the identified non-driving unit during the reference movement time, and deactivating the identified driving unit at the same time.

In other words, performing the avoidance movement may include identifying the rotating axis and the non-rotating axis, stopping the identified rotating axis, and rotating the non-rotating axis for the reference movement time.

Figure 7:
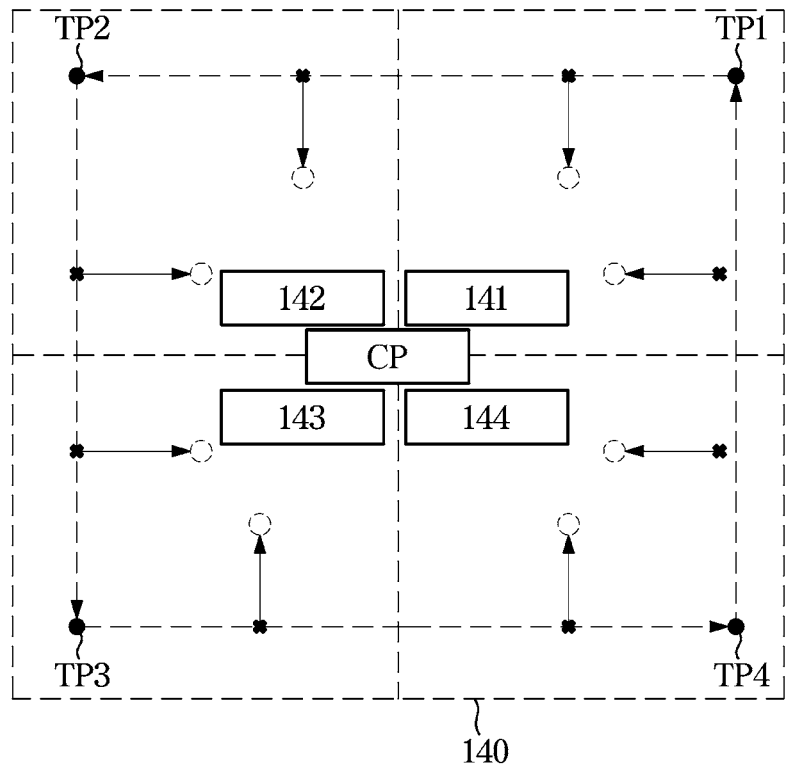
FIG. 7, FIG. 8, FIG. 9, FIG. 10, FIG. 11, FIG. 12 and FIG. 13 are exemplary views illustrating mechanical interference avoidance of a mirror member of a side mirror provided in a vehicle in accordance with various exemplary embodiments of the present invention.

This is described with reference to FIG. 7 and this is described based on the quadrant which is divided centering on the center position.

When the mirror member of the side mirror moves to the left from the first point TP1 to the second point TP2, if it is determined that the mirror member is stopped in the first quadrant 141 due to mechanical interference, the mirror member is moved downwards toward the center position CP by the reference distance, also, if it is determined that the mirror member is stopped in the second quadrant 142 due to mechanical interference, the mirror member is moved downwards toward the center position CP by the reference distance. When the mirror member of the side mirror moves downwardly from the second point TP2 to the third point TP3, if it is determined that the mirror member is stopped in the second quadrant 142 due to mechanical interference, the mirror member is moved to the right toward the center position CP by the reference distance, also, if it is determined that the mirror member is stopped in the third quadrant 143 due to mechanical interference, the mirror member is moved to the right toward the center position CP by the reference distance.

When the mirror member of the side mirror moves to the right from the third point TP3 to the fourth point TP4, if it is determined that the mirror member is stopped in the third quadrant 143 due to mechanical interference, the mirror member is moved upward toward the center position CP by the reference distance, also, if it is determined that the mirror member is stopped in the fourth quadrant 144 due to mechanical interference, the mirror member is moved upward toward the center position CP by the reference distance.

When the mirror member of the side mirror moves upwards from the fourth point TP4 to the first point TP1, if it is determined that the mirror member is stopped in the fourth quadrant 144 due to mechanical interference, the mirror member is moved to the left toward the center position CP by the reference distance, also, If it is determined that the mirror member is stopped in the first quadrant 141 due to mechanical interference, the mirror member is moved to the left toward the center position CP by the reference distance.

The avoidance movement implemented in the mirror member of the side mirror is described with reference to FIG. 8 and FIG. 9.

Figure 8:
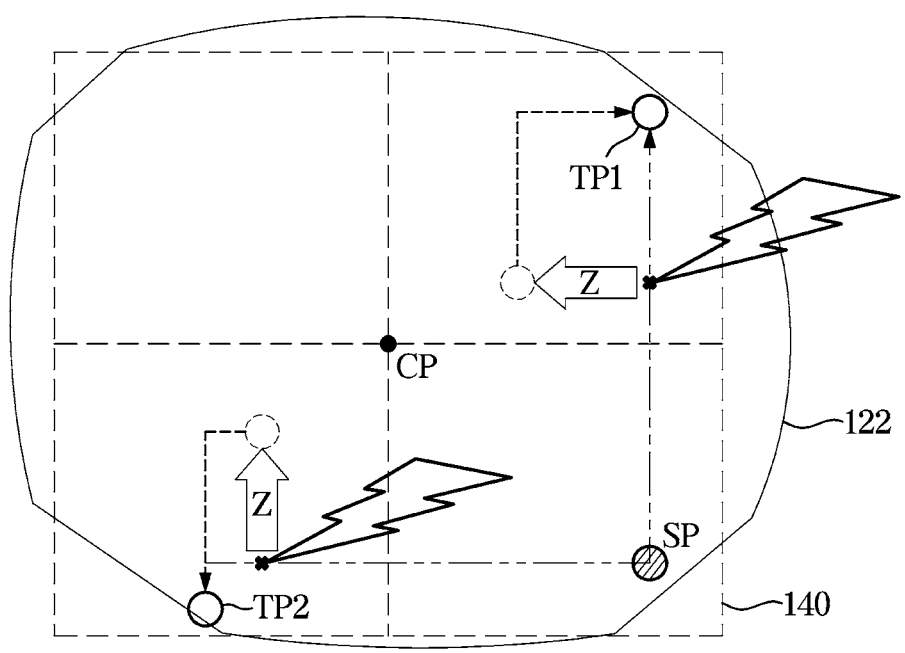

As shown in FIG. 8, the driving apparatus of the side mirror has virtual coordinates 140 in which the mechanical center of the mirror member of the side mirror and the electronic center (i.e., the center position) for controlling the movement of the mirror member are matched.

When the movement of the mirror member is stopped by the mechanical interference during the movement of the mirror member from the current position (i.e., the starting position SP) to the first target position TP1 upward, the driving apparatus of the side mirror moves the mirror member by the reference distance Z in the X-axis perpendicular to the Y-axis being moved, moves by the reference distance Z in the right direction toward the center position which is not the left direction thereof, selects a new path from the position shifted by the reference distance in the right direction to the first target position TP1 and moves the mirror member through the selected new path to the first target position TP1. The driving apparatus of the side mirror may first move the mirror member in the direction of the Y-axis that was being moved when the mirror member is moved to the first target position TP1 with the new path.

When the movement of the mirror member is stopped by the mechanical interference during the movement of the mirror member from the current position (i.e., the starting position SP) to the second target position TP2 to the left, the driving apparatus of the side mirror moves the mirror member by the reference distance Z in the Y-axis perpendicular to the X-axis being moved, moves the mirror member by the reference distance Z in the upward direction toward the center position which is not the downward direction thereof, selects a new path from the position shifted by the reference distance in the upward direction to the second target position TP2 and moves the mirror member through the selected new path to the second target position TP1. The driving apparatus of the side mirror may first move the mirror member in the direction of the X-axis that was being moved when the mirror member is moved to the second target position TP2 with the new path.

Figure 9:
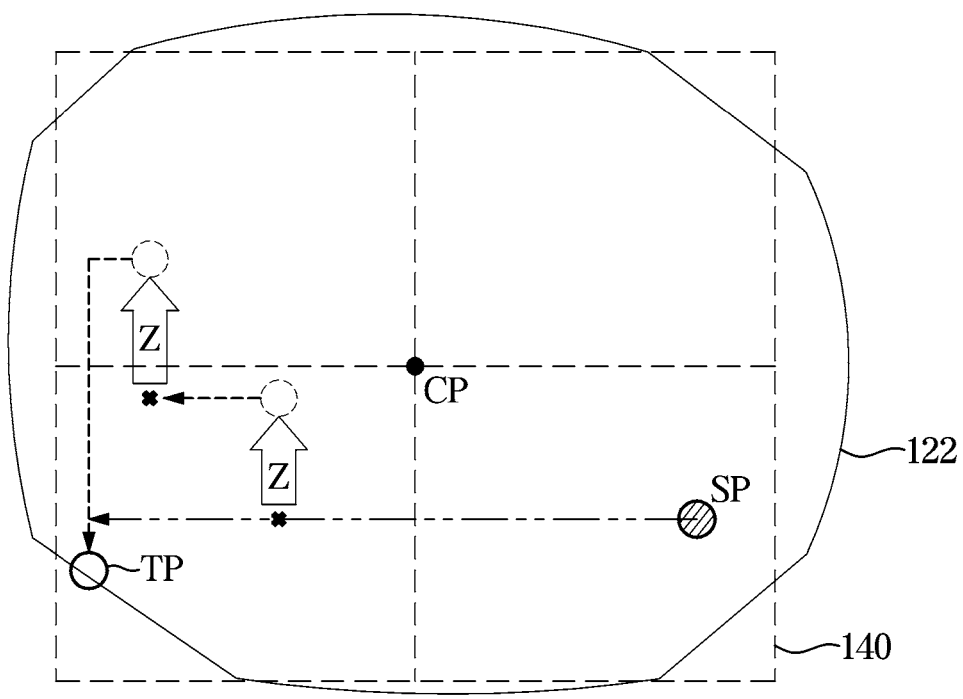

As shown in FIG. 9, when the movement of the mirror member is stopped by the mechanical interference during the movement of the mirror member from the current position (i.e., the starting position SP) to the target position TP to the left, the driving apparatus of the side mirror moves the mirror member by the reference distance Z in the Y-axis perpendicular to the X-axis being moved, moves the mirror member by the reference distance Z in the upward direction toward the center position which is not the downward direction thereof, selects a new path from the position shifted by the reference distance in the upward direction to the target position TP and moves the mirror member through the selected new path to the target position TP.

The driving apparatus of the side mirror may first move the mirror member in the direction of the X-axis that was being moved when the mirror member is moved to the target position TP with the new path, when the movement of the mirror member is stopped by the mechanical interference during the movement of the mirror member along the X-axis, the driving apparatus of the side mirror moves the mirror member by the reference distance Z in the Y-axis perpendicular to the X-axis being moved, moves the mirror member by the reference distance Z in the upward direction which is closer to the center position, selects a new path from the position shifted by the reference distance in the upward direction to the target position TP and moves the mirror member through the selected new path to the target position TP.

The driving apparatus of the side mirror may first move the mirror member in the direction of the X-axis that was being moved when moving the mirror member to the target position TP with the new path.

The avoidance movement implemented in the mirror member 123 having a plurality of concave curved edge portions is described with reference to FIG. 10 and FIG. 11.

Figure 10:
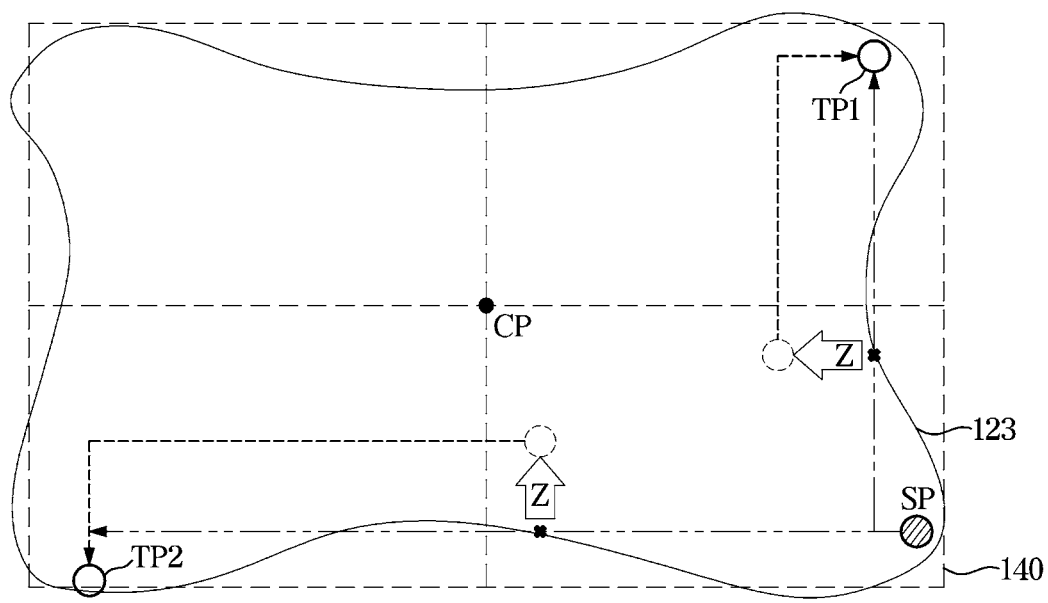

As shown in FIG. 10, the driving apparatus of the side mirror has virtual coordinates 140 in which the mechanical center of the mirror member 120 of the side mirror and the electronic center (i.e., the center position) for controlling the movement of the mirror member are matched.

When the movement of the mirror member is stopped by the mechanical interference during the movement of the mirror member from the current position (i.e., the starting position SP) to the first target position TP1 upward, the driving apparatus of the side mirror moves the mirror member by the reference distance Z in the X-axis perpendicular to the Y-axis being moved, moves by the reference distance Z in the right direction toward the center position which is not the left direction thereof, selects a new path from the position shifted by the reference distance in the right direction to the first target position TP1 and moves the mirror member through the selected new path to the first target position TP1.

The driving apparatus of the side mirror may first move the mirror member in the direction of the Y-axis that was being moved when the mirror member is moved to the first target position TP1 with the new path, and moves the mirror member upward in the same direction as the movement direction before the avoidance movement.

When the movement of the mirror member is stopped by the mechanical interference during the movement of the mirror member from the current position (i.e., the starting position SP) to the second target position TP2 to the left, the driving apparatus of the side mirror moves the mirror member by the reference distance Z in the Y-axis perpendicular to the X-axis being moved, moves the mirror member by the reference distance Z in the upward direction toward the center position which is not the downward direction thereof, selects a new path from the position shifted by the reference distance in the upward direction to the second target position TP2 and moves the mirror member through the selected new path to the second target position TP1. The driving apparatus of the side mirror may first move the mirror member in the direction of the X-axis that was being moved when the mirror member is moved to the second target position TP2 with the new path.

Figure 11:
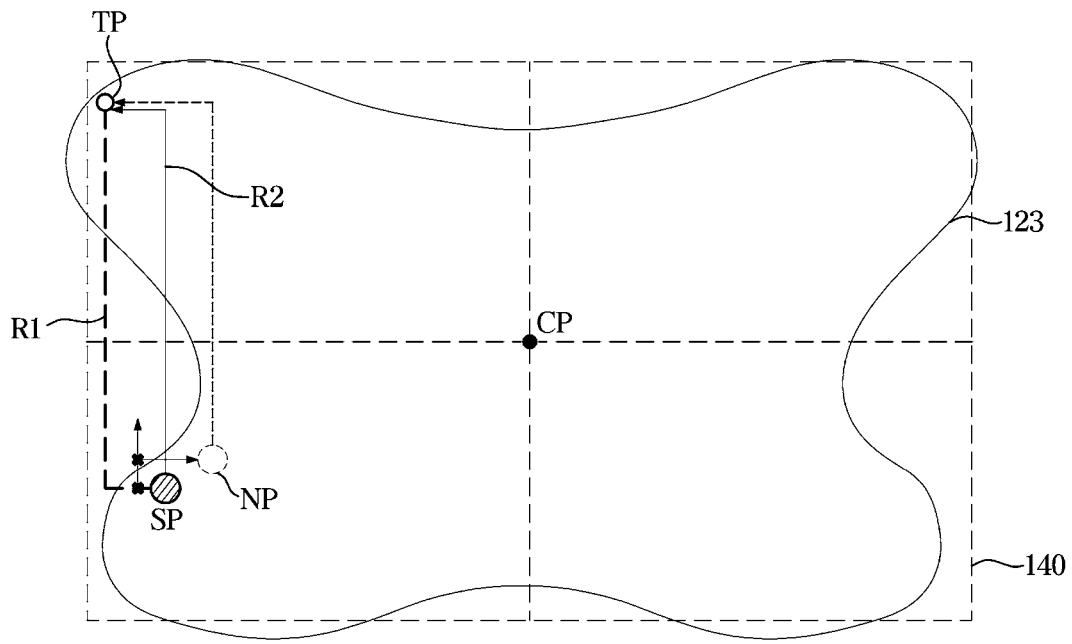

As shown in FIG. 11, the driving apparatus of the side mirror has virtual coordinates 140 in which the mechanical center of the mirror member 120 of the side mirror and the electronic center (i.e., the center position) for controlling the movement of the mirror member are matched.

The driving apparatus of the side mirror may acquires two paths R1 and R2 from the current position to the target position and selects a first path R1 closer to the center position CP among the acquired two paths.

When the movement of the mirror member is stopped by the mechanical interference during the movement of the mirror member from the current position (i.e., the starting position SP) to the target position TP to the left, the driving apparatus of the side mirror moves the mirror member by the reference distance Z in the Y-axis perpendicular to the X-axis being moved, moves the mirror member in the upward direction toward the center position, at the instant time, if the movement is stopped once again due to the mechanical interference without being moved by the reference distance, moves the mirror member by the reference distance Z in the X-axis perpendicular to the Y-axis being moved, moves the mirror member to the left toward the center position CP by the reference distance. The driving apparatus of the side mirror selects a new path from the position NP shifted by the reference distance in the left direction to the target position TP and moves the mirror member to the target position TP with the selected new path. The driving apparatus may move the mirror member first in the direction of the Y-axis which is perpendicular to the last movement axis.

As described above, the present exemplary embodiment of the present invention may easily perform the avoidance movement for avoiding the mechanical interference irrespective of the shape of the mirror member of the side mirror. Even when the mechanical center position CP1 of the mirror member 120 of the side mirror and the electronic center position (i.e., the center position CP) for controlling the movement of the mirror member are inconsistent, avoidance movement for avoiding mechanical interference may be easily performed. This is described with reference to FIG. 12 and FIG. 13.

Figure 12:
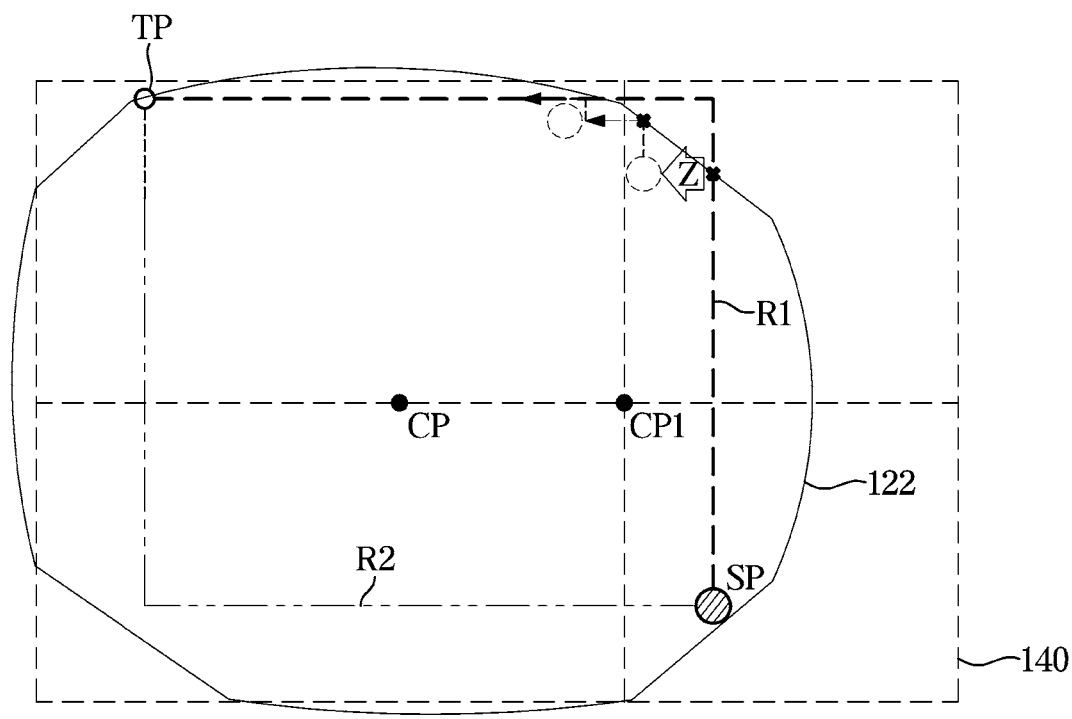

As shown in the FIG. 12, when the movement of the mirror member is stopped by the mechanical interference during the movement of the mirror member from the current position (i.e., the starting position SP) to the target position TP upward, the driving apparatus of the side mirror moves the mirror member by the reference distance Z in the X-axis perpendicular to the Y-axis being moved, moves by the reference distance Z in the left direction toward the center position, selects a new path from the position shifted by the reference distance in the left direction to the target position TP and moves the mirror member through the selected new path to the target position TP. The driving apparatus may move the mirror member upward in the same direction as the movement direction before the avoidance movement.

When the movement of the mirror member is stopped by the mechanical interference during the movement along the new path, the driving apparatus of the side mirror moves the mirror member by the reference distance Z in the X-axis perpendicular to the Y-axis being moved, moves by the reference distance Z in the left direction toward the center position, selects a new path from the position shifted by the reference distance in the left direction to the target position TP and moves the mirror member through the selected new path to the target position TP. The driving apparatus may move the mirror member upward in the same direction as the movement direction before the avoidance movement.

Figure 13:
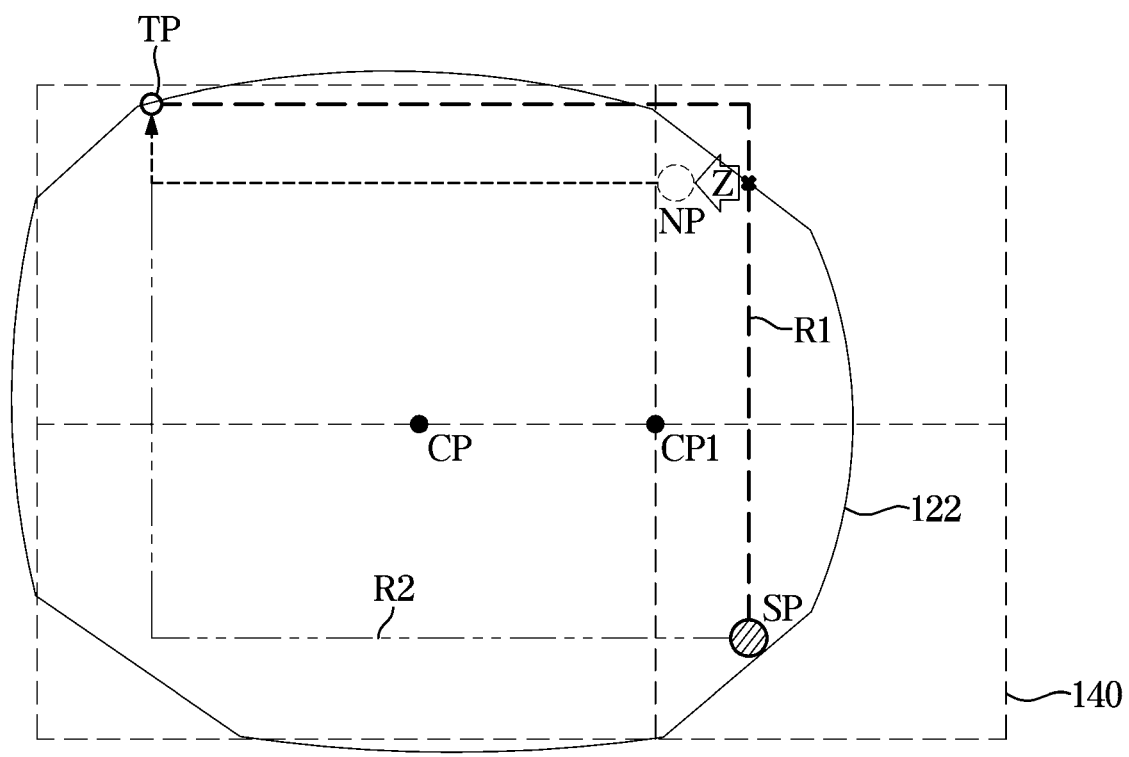

As shown in the FIG. 13, when the movement of the mirror member is stopped by the mechanical interference during the movement of the mirror member from the current position (i.e., the starting position SP) to the target position TP upward, the driving apparatus of the side mirror provided in the vehicle moves the mirror member by the reference distance Z in the X-axis perpendicular to the Y-axis being moved, moves by the reference distance Z in the left direction toward the center position, selects a new path from the position shifted by the reference distance in the left direction to the target position TP and moves the mirror member through the selected new path to the target position TP. The driving apparatus may move the mirror member first in the same direction as the movement direction after the avoidance movement according to the new path. When the avoidance movement is completed, the vehicle identifies the avoided moved position, acquires a plurality of paths between the identified position and the target position, selects any one from the acquired paths 216, and moves the mirror member based on the selected path. The acquisition of a plurality of paths and the selection of any one path are similarly described in FIG. 3.

As described above, the exemplary embodiments included with reference to the accompanying drawings have been described.

According to the included embodiment, when the angle of the mirror member provided in the side mirror is automatically adjusted, it is possible to prevent the user from being mistaken that the side mirror is defective by reducing the number of times of zig-zag movement. This may reduce a user's visit to a service center or workshop.

Also, according to the included embodiment, it is possible to reduce the time for which the angle of the mirror member provided in the side mirror is automatically adjusted, and the power consumption by the automatic adjustment of the side mirror may be reduced.

Also, according to the included embodiment, it is possible to improve the quality and merchantability of the side mirror and the vehicle having the side mirror, further improve the satisfaction of the user, and secure the competitiveness of the product.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A driving apparatus of a side mirror, the apparatus comprising:
    a mirror member mounted inside a housing and selectively movable in the housing;
    a first driving unit connected to the mirror member;
    a second driving unit connected to the mirror member; and
    a controller configured to acquire a plurality of paths for moving the mirror member from a current position of the mirror member to a target position, identify multiple positions or one position for switching a movement direction for each of the acquired plurality of paths, select a path having positions for switching the movement direction closest to a predetermined center position among respective positions for switching the movement direction, and selectively control driving of the first driving unit and the second driving unit based on the selected path,
    wherein the first driving unit connected to the mirror member is configured to move the mirror member with respect to a first axis in a response to a control command of the controller; and
    wherein the second driving unit connected to the mirror member is configured to move the mirror member with respect to a second axis in a response to a control command of the controller.

2. The driving apparatus according to claim 1,
    wherein the controller is configured to acquire the plurality of paths that are movable from the current position to the target position in one X-axial direction movement and one Y-axial direction movement.

3. The driving apparatus according to claim 1, further includes:
    a storage unit of storing coordinate information having an X-axis value as an angle when rotating about the first axis and a Y-axis value as an angle when rotating about the second axis,
    wherein the controller is configured to identify a current coordinate value corresponding to the current position and a target coordinate value corresponding to the target position, and acquire a plurality of paths movable from the current position to the target position by one X-axis movement and one Y-axis movement based on the identified current coordinate value and the target coordinate value when acquiring the plurality of paths.

4. The driving apparatus according to claim 3,
    wherein the controller is configured to identify a coordinate value of a position for switching the movement direction which is shifted from one axis to another axis when identifying the multiple positions or the one position for switching the movement direction for each of to the acquired plurality of paths.

5. The driving apparatus according to claim 4,
    wherein the controller is configured to identify the multiple positions or the one position for switching the movement direction closest to the predetermined center position based on the coordinate value of the identified positions for switching the movement direction and the current coordinate value of the predetermined center position and select the path having the identified closest positions for switching the movement direction when selecting the path.

6. The driving apparatus according to claim 3, wherein, when the position of the mirror member remains equal to or longer than a reference time during movement of the mirror member by one of the first and second axes, the controller is configured to control the mirror member to move by a reference distance along an axis perpendicular to one of the first and second axes.

7. The driving apparatus according to claim 6, wherein, when the mirror member is controlled to move by the reference distance along the axis perpendicular to the one of the first and second axes, the controller is configured to move the mirror member by the reference distance in a direction toward the center position.

8. The driving apparatus according to claim 6, wherein, when the mirror member moves by the reference distance, the controller is configured to acquire a plurality of new paths from a moved position to the target position, select a new path from the plurality of acquired new paths and control movement of the mirror member to the selected new path.

9. The driving apparatus according to claim 1, wherein, when a moved position of the mirror member remains equal to or longer than a reference time during driving of one of the first driving unit and the second driving unit based on the selected path, the controller is configured to control the driving of the other of the first and second driving units.

10. The driving apparatus according to claim 9, wherein when controlling the other of the first and second driving units, the controller is configured to control rotation direction of the other of the first and second driving units so that the mirror member is moved to the predetermined center position.

11. A vehicle comprising:
a side mirror including a housing and a mirror member mounted inside the housing and selectively rotatable in a first axis and a second axis in the housing;
an input unit configured to receive an identification information related to a driver;
a driving apparatus including a controller which is connected to the input unit and configured to identify a target position corresponding to the identification information related to the driver, acquire a plurality of paths for moving the mirror member between the identified target position and a current position of the mirror member, identify multiple positions or one position for switching a movement direction for each of the acquired plurality of paths, select a path having positions for switching the movement direction closest to a predetermined center position among respective positions for switching the movement direction thereof, and selectively control rotation of the first axis and rotation of the second axis of the mirror member based on the selected path.

12. The vehicle according to claim 11,
wherein the driving apparatus is configured to acquire a plurality of paths that are movable from the current position to the target position in one X-axial direction movement and one Y-axial direction movement.

13. The vehicle according to claim 11, further includes:
a storage unit of storing coordinate information having an X-axis value as an angle when rotating about the first axis and a Y-axis value as an angle when rotating about the second axis,
wherein the controller is configured to identify a current coordinate value corresponding to the current position and a target coordinate value corresponding to the target position, and acquire a plurality of paths movable from the current position to the target position by one X-axis movement and one Y-axis movement based on the identified current coordinate value and the target coordinate value when acquiring the plurality of paths,
wherein the controller is configured to identify a coordinate value of a position for switching the movement direction which is shifted from one axis to another axis when identifying the multiple positions or one position for switching the movement direction for each of the acquired plurality of paths,
wherein the controller is configured to identify positions for switching the movement direction closest to a predetermined center position based on the coordinate value of the identified position for switching the movement direction and the coordinate value of the predetermined center position and select the path having the identified closest positions for switching the movement direction when selecting the path.

14. The vehicle according to claim 13,
wherein, when the position of the mirror member remains equal to or longer than a reference time during movement of the mirror member by one of the first and second axes, the controller is configured to control the mirror member to be moved by a reference distance along an axis perpendicular to the one of the first and second axes.

15. The vehicle according to claim 14,
wherein when the mirror member is controlled to move by the reference distance along the axis perpendicular to the one of the first and second axes, the controller is configured to move the mirror member by the reference distance in a direction toward the predetermined center position and when the mirror member moves by the reference distance, the controller is configured to acquire a plurality of new paths from a moved position to the target position, select one new path from the plurality of acquired new paths and control movement of the mirror member to the selected new path.

16. The vehicle according to claim 11,
wherein the driving apparatus includes a driving unit having a first driving unit and a second driving unit, the first driving unit connected to the mirror member and rotating the mirror member with respect to the first axis according to a signal of the controller and the second driving unit connected to the mirror member and rotating the mirror member with respect to the second axis according to a signal of the controller, and
wherein, when a moved position of the mirror member remains equal to or longer than a reference time during driving of one of the first driving unit and the second driving unit based on the selected path, the controller is configured to control the driving of the other of the first and second driving units.

17. The vehicle according to claim 16, wherein upon controlling the other of the first and second driving units, the controller is configured to control rotation direction of the other of the first and second driving units so that the mirror member is moved to the predetermined center position.

18. A method of controlling a side mirror including a housing and a mirror member mounted inside the housing and selectively rotatable in a first axis and a second axis in the housing including:
when an identification information related to a driver is received, identifying, by a controller, a target position corresponding to the identification information related to the driver;
acquiring, by the controller, a plurality of paths for moving the mirror member between the identified target position and a current position of the mirror member;
identifying, by the controller, each of positions for switching the movement direction of the acquired plurality of paths;
selecting, by the controller, a path having positions for switching the movement direction closest to a predetermined center position among the respective positions for switching the movement direction;
selectively controlling, by the controller, rotation of the first axis and rotation of the second axis of the mirror member based on the selected path; and
when a position of the mirror member remains equal to or longer than a reference time during rotation of the mirror member by one of the first and second axes, moving, according to a signal of the controller, the mirror member by a reference distance along an axis perpendicular to the one of the first and second axes.

19. The method according to claim 18, wherein the moving the mirror member by the reference distance along the axis perpendicular to the one of the first and second axes includes:
moving the mirror member by the reference distance in a direction toward the predetermined center position.

20. The method according to claim 18, wherein the moving the mirror member by the reference distance along the axis perpendicular to the one of the first and second axes includes:

operating one driving unit which is not driven among a first driving unit rotating the mirror member about the first axis and a second driving unit rotating the mirror member about the second axis for a reference moving time.

\* \* \* \* \*